June 21, 1960

C. R. KEYS

2,941,682

DUMPING RECEPTACLE AND MEANS FOR HANDLING
AND MANIPULATING THE SAME

Filed Oct. 21, 1954

INVENTOR
C. Roy Keys

BY *Lancaster, Allwine & Rommel*
ATTORNEYS

June 21, 1960

C. R. KEYS 2,941,682

DUMPING RECEPTACLE AND MEANS FOR HANDLING
AND MANIPULATING THE SAME

Filed Oct. 21, 1954

INVENTOR
C. Roy Keys

June 21, 1960

C. R. KEYS

2,941,682

DUMPING RECEPTACLE AND MEANS FOR HANDLING
AND MANIPULATING THE SAME

Filed Oct. 21, 1954

INVENTOR
C. Roy Keys

BY
ATTORNEYS

June 21, 1960

C. R. KEYS 2,941,682

DUMPING RECEPTACLE AND MEANS FOR HANDLING
AND MANIPULATING THE SAME

Filed Oct. 21, 1954

INVENTOR
C. Roy Keys

BY Lancaster, Allwine Rommel
ATTORNEYS

June 21, 1960

C. R. KEYS

2,941,682

DUMPING RECEPTACLE AND MEANS FOR HANDLING
AND MANIPULATING THE SAME

Filed Oct. 21, 1954

INVENTOR
C. Roy Keys

ATTORNEYS

United States Patent Office 2,941,682
Patented June 21, 1960

2,941,682

DUMPING RECEPTACLE AND MEANS FOR HANDLING AND MANIPULATING THE SAME

Conrad Roy Keys, 702 Ridge St., Newark, N.J.

Filed Oct. 21, 1954, Ser. No. 463,646

9 Claims. (Cl. 214—307)

This invention relates to improvements in receptacles for the efficient and expeditious loading and dumping of loose materials, either wet or dry, or a mixture of the same. The improved receptacle is adapted for use with available loading, hauling and dumping equipment, including cranes, hoisting vehicles or other equipment for tilting and dumping the receptacle.

The primary object of this invention is the provision of an improved receptacle or bucket adapted to meet the needs of the current and increasing collection of refuse around such establishments as super markets, retail stores, hospitals, housing units, eating places, etc. Generally this refuse is in the form of garbage, vegetable waste, sweepings, disposable packaging and other loose materials. Generally such materials accumulate quickly, and it has been an increasing problem to efficiently and economically handle it. The improved receptacle of the present invention includes an arrangement of parts which enables the quick loading and mass accumulation of materials therein; the same having discharge closure means and such as will enable the expeditious dumping of the materials therefrom without the necessity of manual intervention and manipulation of the closure means.

A further object of this invention is the provision of an improved receptacle construction, adapted for the collection and dumping of loose materials, which can be manufactured and sold at comparatively low cost consistent with the strength and durability and interchangeability of the parts thereof. Since the materials to be handled in many cases are socially objectionable; the improved receptacle construction includes a closure sealing means to prevent escape of objectionable odors, and access of insects and drainage water to the receptacle chamber. Its construction enables the satisfactory handling of materials from a sanitation and good housekeeping standpoint, even over considerable periods of time, in all sorts of weather. The chamber of the receptacle may be readily disinfected and cleaned.

A further object of this invention is the provision of an improved materials handling receptacle, adapted to receive objectionable waste materials, having a closure means which admits of top, side and end loading and end dumping. It is of such nature that the materials may be transported over rough terrain without dropping or loss of the contents.

A further object of this invention is the provision of a receptacle adapted for the loading, transportation and dumping of loose materials, which is of relatively large capacity and size. It is adaptable for use in connection with a vehicle having dumping mechanism with its center of gravity disposed a considerable distance forwardly of the rear axle construction of the vehicle; thus enabling transportation with correct load distribution.

A further object of this invention is the provision of an improved discharge closure construction for receptacles which will enable the automatic opening thereof, upon tilting of the receptacle to a desired degree, in order that the contents of the receptacles may be efficiently and quickly dumped without direct manual control of the discharge closure.

A further object of this invention is to provide a receptacle for the loading, hauling and dumping of loose materials, including an improved closure construction for the various charging and discharging openings; the same being sealed with material easily installed and replaceable. The improved closures have latches and locks to prevent exposure of the contents to the atmosphere and against access by unauthorized persons.

Another object of the invention is to provide an improved receptacle for the loading, hauling and dumping of loose materials, having a discharge opening with an area of such proportionate size, with respect to the cross sections of the chamber thereof, that the material with which it has been charged will readily and totally discharge itself upon tilting and manipulation of the receptacle.

A further object of the invention is to provide an improved receptacle or bucket construction adapted for use in connection with the loading, hauling and dumping of waste materials, the mechanism of which may be economically and easily installed and adjusted and the discharge opening of which is provided with closure means which will automatically actuate upon tilting of the receptacle to the proper degree, so as to present no interference or restriction to the complete discharge of the contents of the receptacle. The discharge closure construction will automatically return to a closed position when the receptacle is returned to a normal transporting position.

A further object of this invention is the provision of an improved means to enable proper tilting and dumping of the receptacle bodies, either from vehicles, other modes of transportation, and from docks, etc.

Other objects and advantages of this invention will be apparent from the following detailed description:

In the accompanying drawings:

Figure 10 is a view of the form of invention shown in

Figure 9, in dumping position with respect to the vehicle upon which it is mounted.

In the drawings, wherein for the purpose of illustration are shown preferred and modified forms of the invention, the letter A may generally designate the preferred form of receptacle adapted to be supported upon a transporting and dumping vehicle B. The latter has lifting and lowering and dumping equipment C mounted thereon.

Figure 9:
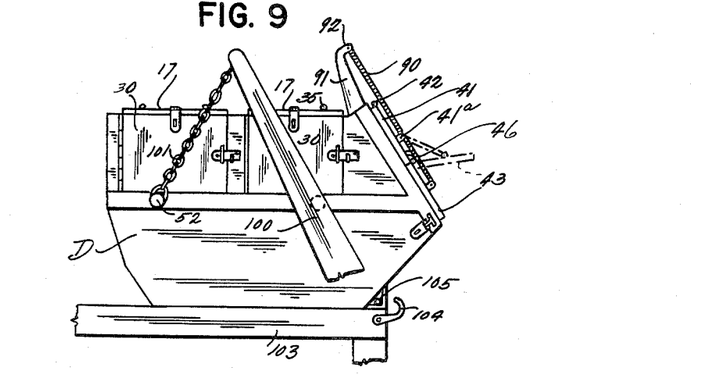
Figure 9 is a side elevation of a first modified form of bucket structure, having a different mode of discharge closure actuation; the bucket being shown in horizontal transporting position.
Figure 10:
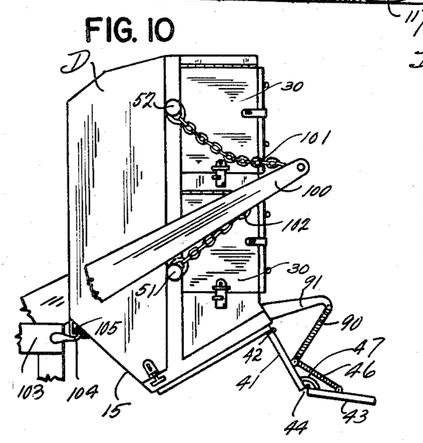
Figure 11:
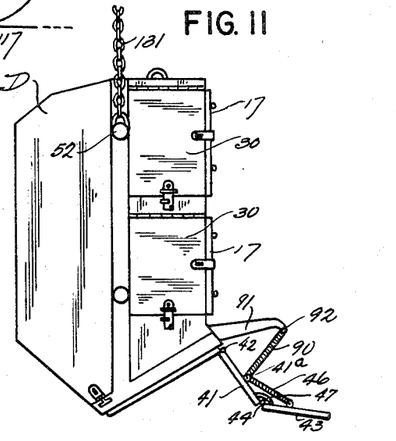
Figure 11 is a view of the form of invention shown in Figure 9, but with a different mode of dumping support, such as from a crane.

A first modified form of bucket construction D may be provided, as shown in Figures 9, 10 and 11, possessing many of the structural characteristics of the bucket construction A, but embodying a different arrangement for opening the rear closures as the bucket is tilted into dumping position. A second modified form of receptacle E is provided having a different mode of actuating the discharge closures, and including an improved mechanism F mounted upon the transporting and dumping vehicle A', for the purpose of tripping the bucket and actuating the discharge closures into open position as the bucket is tripped for discharge of its contents.

Referring to the receptacles A, D and E, the same reference characters will be applied to corresponding parts of these receptacles in as much as they are similarly constructed, except for the means of actuating the rear discharge closures. To that end, each of the same is formed of metallic plate sections, preferably welded together and suitably reinforced to provide a unitary one-piece structure having top, side and rear openings with suitable closures to be hereinafter described. Each receptacle body includes a bottom wall 12, a top wall 13, front end wall structure 14 and a rear wall 15. The walls 12 and 13 are shown parallel but may be in angular relation. The front wall structure 14 preferably includes an upper wall portion 14ᵃ which is positioned in right angled relation to the top wall 12; an intermediate wall portion 14ᵇ which is slightly angled rearwardly and a bottom or more acutely angled portion 14ᶜ.

The rear wall includes a lower diagonally sloping portion 15, disposed at an acute angle with respect to the plane of the bottom wall 12. When the bucket is in horizontal position it slopes upwardly and to the rear; this slope facilitating easy tilting of the bucket to a dumping position off of the rear apron of dumping vehicle B. It also facilitates discharge of the receptacle contents.

Figures 3, 7:
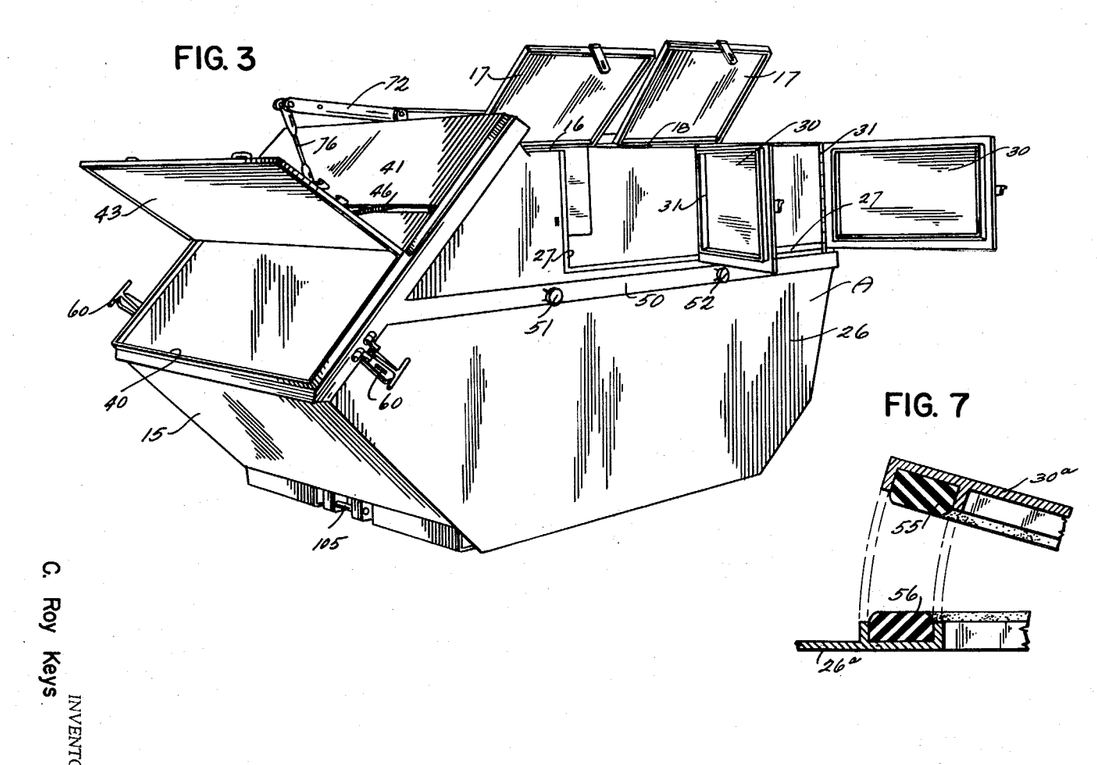
Figure 3 is a perspective view of the improved bucket or receptacle, showing the closures for the top, sides and end walls, some of which are in opened or partially opened position.
Figure 7 is a fragmentary view, partly in section, showing one form of closure sealing means.
Figure 6:
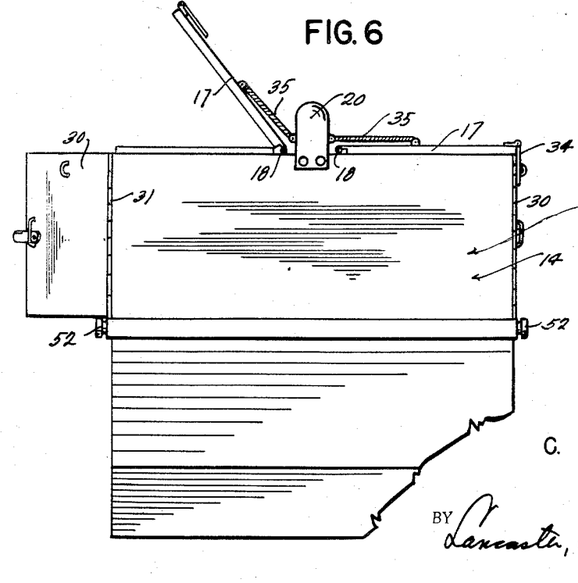
Figure 6 is a fragmentary front end view of the receptacle, showing certain closures.

The top wall structure 13 is preferably provided with four charging openings 16, two at each side of the longitudinal center of the bucket A. They have individual closures 17 hinged at 18 upon the top wall, along the sides of a raised spring receiving casing 20. The closures 17 open, as shown in Figures 3 and 6, to permit filling of the chamber 25 of the bucket from the top at either side thereof.

The body of the receptacles A, D and E each include parallel side walls 26. Each side wall is provided with side openings 27 just below the top wall 13; the bottom edges of which are spaced appreciably above the bottom wall 12. These openings are provided in the side walls for access to the upper half of the chamber 25; the lower edges being spaced above the top edge of the rear sloping wall 15. The lower half of the chamber 25 does not have any openings or closures therein. This makes it possible to fill the chamber 25 from the top, side and rear openings. The side walls 26 are provided with closures 30 for the openings 27 hinged at 31 at the front edges of said openings. The closures 30 swing outwardly and forwardly to an open position, as shown in Figure 3 for filling the bottom portion of the chamber 25.

The filling of the lower portion of the chamber 25 is made through the top, end and side openings of the receptacle. The side closures 30 have latches 33 constructed to automatically snap shut upon closing the side doors 30. Hasps and staples for padlocking the closures 17 and 30, may be provided, as indicated at 34. It will be noted that the top and side openings communicate directly with each other. The free edges of the top doors seal and contact with their respective side doors.

The top closures 17 are provided with tension springs 35 to counterbalance the weight of the top closures 17 and enable the ready swinging of the same to opened positions. The springs 35 are attached by lugs to the closure at one end and the top wall 13 at the other end and lies across the hinged juncture. When the lids are closed the pull of the spring is only slightly above the center line of the hinge and the weight of the door or lid holds it shut. When a lid 17 is swung to a slight angled opened position its spring 35 becomes truly effective to swing and hold the closure opened to permit charging.

Figure 2:
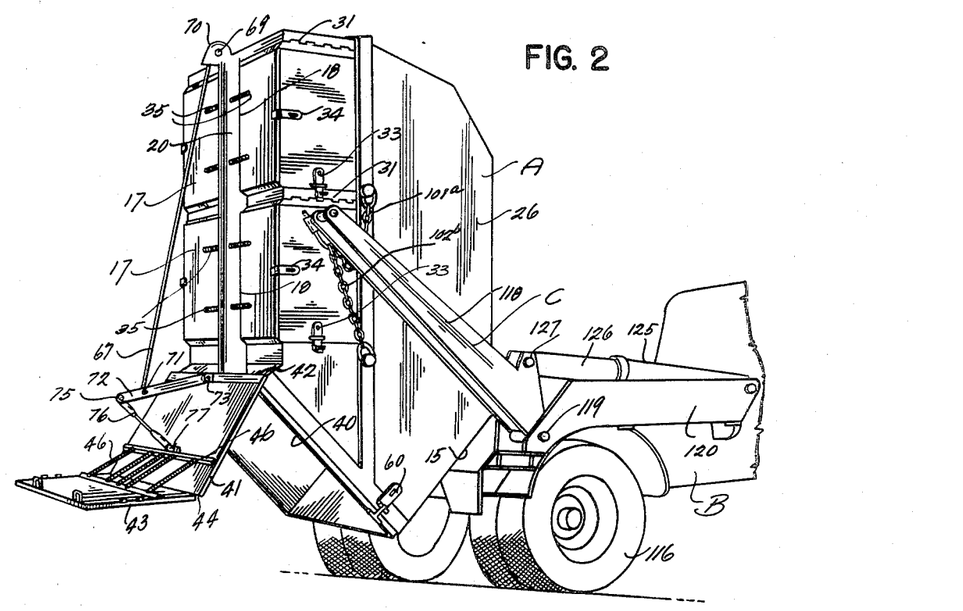
Figure 2 is a perspective view showing the bucket or receptacle in dumping position upon the vehicle.

The hasp type lock mechanisms 34 also enable the top closures 17 to be locked, as will be apparent from Figure 2; the hinged hasps being located directly on the closures 17, and the padlock receiving staple being positioned upon the side doors 30. Thereofore the unitary hasp construction holds both doors closed.

The upper portion of the rear of the receptacle has a discharge opening 40. The slope of the wall wherein this opening is provided is at an angle of greater than 90° with respect to the plane of the top wall 13, the same sloping downwardly and rearwardly. It will be noted that when the bucket is tilted to dumping position as shown in Figure 2 the wall portion 15 acts as a chute to permit ready and complete discharge of the contents of the chamber 25, through the discharge opening 40.

Figure 4:
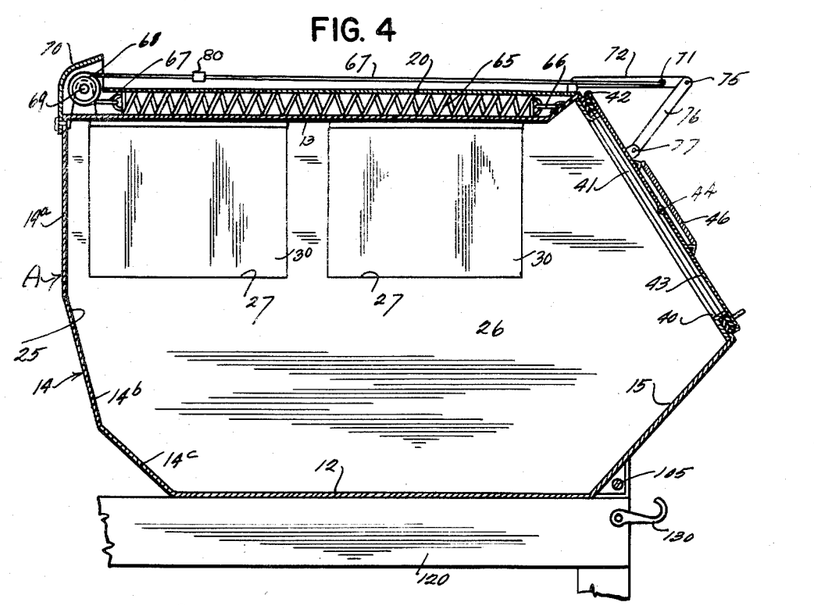
Figure 4 is a longitudinal cross-sectional view taken through the improved bucket or receptacle, showing details of the structure of the receptacle and the end discharge closures, and means for enabling the operation thereof. The bucket is shown in horizontal position upon a vehicle or other support.

An improved closure construction is provided for the discharge opening 40, consisting of an upper discharge door portion 41, hinged at 42. A second closure 43 is hinged at 44, in complementary relation upon the free margin of door portion 41. As shown in Figure 4 these door portions 41 and 43 will normally lie in the same plane when closed, and to that extent are gravity actuated to assume closed positions over the opening 40. Springs 46 are connected at opposite ends to the door portions 41 and 43, at opposite sides of the hinged connection 44. They are under tension and normally tend to open the lower closure to a degree sufficient to permit charging. The normal position of the springs 46 is shown as paralleling the closures 41 and 43 when the latter are closed, over the opening 40, as shown in Figure 4. Their action will be later described.

The springs 46 for the discharge closures 41 and 43 act in a manner similar to the springs of the top closures. Because the tensioned spring lies close to the center line of the hinge 44 the weight of the door 43 will normally close it over the opening 40. However, when the door 43 is swung slightly opened the tension of the springs 46 will act with increasing lift to open the door or lid 43 and hold it open for rear charging. This condition is shown in Figure 3 in full lines, and in dotted lines in Figure 9.

The body structures of the receptacles are marginally reinforced about all of the openings, and especially the rear discharge opening. Intermediate the height thereof the side walls 26 are provided with reinforcing rails or members 50. Upon these members 50 and the side walls 26 are preferably located headed lugs 51 and 52, relatively located at opposite sides of the center of gravity of the bucket, for connection with suitable chains or other lifting, supporting, and lowering hoist mechanism.

In order to seal the bucket openings and closures against escape of odors and leakage, it is preferred to provide them with sealing strips around their marginal edges. This may be variously done, but as shown in Figure 7 closure 17ª is provided with soft marginal sealing strips 55, and similarly the walls 26ª may be provided with complementary sealing strips 56.

Figure 1:
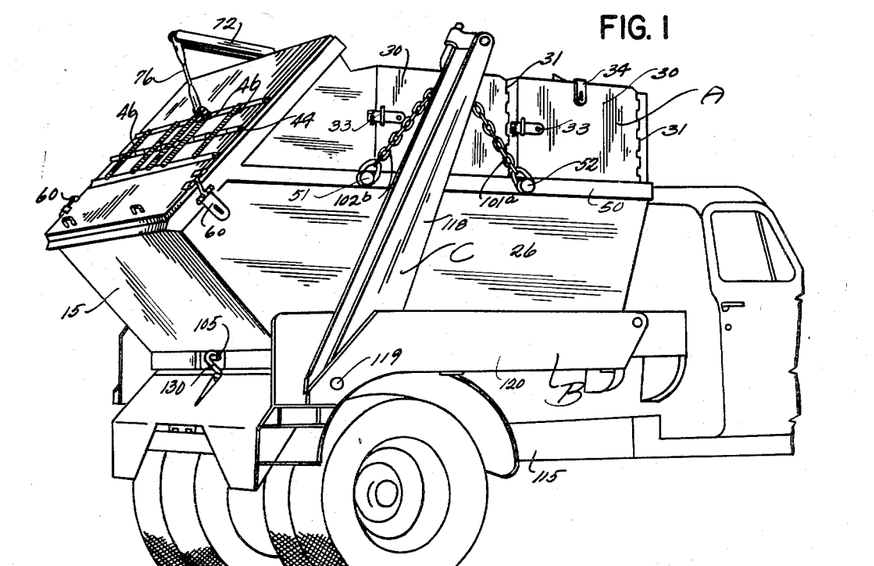
Figure 1 is a perspective view of the improved receptacle or bucket mounted upon a hauling and dumping vehicle (only partially shown). In this view the bucket or receptacle is shown in horizontal hauling position.

The discharge closures are held in sealed shut position by means of latches 60, complementary portions of which are attached to the side walls of the receptacle and the side portions of the lowermost closure 43, as shown in Figures 1, 2 and 3 of the drawings. These are lever type latches and manually controlled.

To the extent above indicated the buckets or receptacles A, D and E are identical, and the same reference characters have been applied to corresponding parts.

Figures 4A, 5, 8:
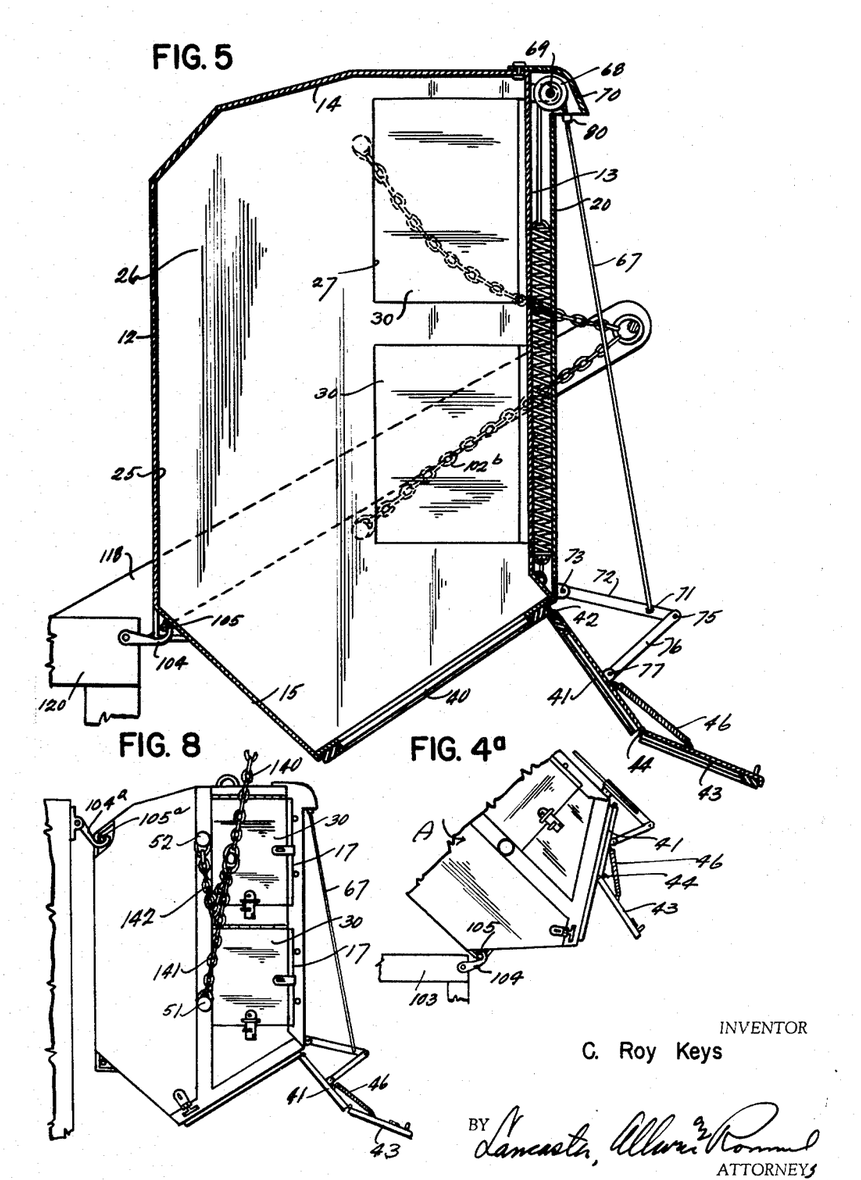
Figure 4a shows the bucket A tilted to the point where the springs for the lower lid of the discharge closure will open said lower lid.
Figure 5 is a cross-sectional view of the improved bucket or receptacle, showing it in dumping or discharge position.
Figure 8 is a view of the improved bucket or receptacle in dumping position, such as when being manipulated by a crane or hoist off of a dock or other support.

Referring to the discharge closure automatic opening and closing arrangement for the preferred form of bucket A, the same is externally shown in Figures 1, 2 and 3 of the drawings, and in a cross-section view in Figures 4 and 5. The latter views show the operating details thereof in lid closed and lid opened positions respectively.

A powerful spring 65, under tension, is located in the elongated casing 20 at the longitudinal top center of the receptacle A. Its rear end 66 is secured to the casing. The opposite end has a cable 67 connected therewith trained over a pulley 68 which is rotatably mounted at 69 upon a suitable bracket arrangement on the top wall 13. A protecting shield or shroud 70 may be located at the opened front end of the casing. The cable 67 extends rearwardly and is connected at 71 with the outer end of a pivoted crank arm 72; the latter being pivoted at 73 upon a lug type bracket at the rear end of the casing 20, as shown in Figure 5. The crank arm 72 at its outer end is pivotally connected at 75 to a strut 76 which is pivoted in turn at 77 upon the discharge closures portion 41 at a location intermediate the hinge 42 and the free end of the closure 41, as shown in Figures 4 and 5 of the drawings. The points 73, 75 and 77 when the closures are shut may represent an equilateral triangle although for different sizes of buckets this arrangement may vary.

The bucket A may be tilted from a transporting position shown in Figure 4 to the position shown in Figure 4ª to the full dumping position shown in Figure 5. When it has reached the attitude shown in Figure 4ª the effective gravity which has held the lower half of the discharge closure construction against the bucket is now reversed in direction with respect to the bucket, and weight of the lid section 43 and the effort of springs 46 will cause the lid section 43 to assume the attitude shown in Figure 4ª.

When the center of gravity of the upper and lower discharge doors, incident to further tilting of the receptacle from position Figure 4ª, to the position of Figure 5 has passed a point vertically below the hinge 42, the effective gravity on the combination closure will cause a movement of the upper and lower discharge closures 41 and 43 away from the body and opening of the bucket. As the bucket is tilted further toward the position shown in Figure 5 the effective gravity will become great enough so that a push outwardly is exerted on the strut 76 and thereby transmitted to the crank arm 72. This will cause the crank arm to move upwardly and outwardly from the body of the receptacle A. Then the effort of spring 65, which has previously maintained the pivot point 73 in direct sheer, will cause the crank arm 72 to rotate through an arc with pivot point 73 as a center, exerting a pull on the strut 76. Thereby the two closures will assume an attitude with respect to the body of the bucket A approximately as shown in Figure 5 when the bucket has been tilted to a vertical dumping position. At this point the effective gravity on the two closures is offset by the effort of spring 65. It will be noted that a stop 80 is provided on the cable 67 so that when the bucket or receptacle is at full dumping position it will engage the shroud or shield 70. Thus, any outside effort to lift the doors further would not have any undesirable results. As the receptacle A is returned from the position shown in Figure 5 to the position shown in Figure 4 the effect of gravity on the combination of two closures 41 and 43 is increased and eventually overcomes the effort of the spring 65. Then the closure 41 comes to a rest position over the upper part of the opening 40 and subsequently door 43 comes to rest partially ajar in the position shown in Figure 3.

The first modified form of receptacle D is shown in Figures 9, 10 and 11. It is of the same construction described for the bucket A, except for the means which control the actuation of its rear discharge closures 41 and 43. The closure 41 is provided with a tension spring 90 connected between the hinge connection of the closure 41 and the free edge of that closure portion. The opposite end of said spring 90 is connected to the upper end of a standard 91, at 92, and in such relation that the spring 90, when the closure 41 is shut, will lie in parallelism with the closure portion 41. The spring lies very close to the center or axis of the pivot 42 so that the pull of the spring when the lid is closed is such that the weight of the door 41 will keep it closed. As the bucket or receptacle is tilted from the position shown in Figure 9, for dumping, as indicated above for the bucket A, the center of gravity of the lower closure 43 will change and when the center of gravity of lid 43 is approximately vertically below the hinge point 44 the effect of gravity to close the lid portion 43 disappears and then the pull of spring 46 will cause this lid to open to the position limited by stop 47. As bucket is further tilted to a greater degree and the center of gravity of the combination closure 41 and 43 passes beyond a point vertically below hinge point 42, the pull of spring 90 will enable the closures 41 and 43 to more fully open, to the positions shown in Figs. 10 and 11. When the receptacle D is being returned to horizontal position, the increasing effect of gravity will offset and exceed the effort of spring 90 and the upper closure 41 will shut against the bucket.

In Figure 9 the bucket D is shown as located upon a vehicle or other support having a hoist mechanism for elevating and lowering the bucket, such as will be further described. In Figure 10 the hoist mechanism may consist of a crane or boom arm 100 having flexible chains 101 and 102 detachably connected to the hoist attaching lugs 51 and 52. The hoist mechanism for buckets such as A and D may comprise a crane or other free swinging hoist means and the frame 103 may comprise a dock from which the contents of bucket D is to be dumped into a scow or the like. A hook 104 is located upon dock 103 for engagement with the bucket cross pin 105, to facilitate tipping. Frame 103 may also be vehicle carried.

It is within contemplation of this invention to eliminate the springs 46 in the form of invention A shown in Figures 4, 4ª and 5, and to extend the cable 67 around a sheave or pulley at the location 71 on the crank arm 72. The cable will ride over this pulley and under another pulley attached to door 41 between points 42 and 77 and the extreme end of cable 67 will be attached to the lower closure 43 at about the location where the spring 46 is shown attached thereto. A stop may be placed on cable 67 between the two pulleys to contact the pulley at point 71 when the lower lid 43 is opened. Such an arrangement will provide counterbalance for the closure or lid portion 43 from an initial travel of the spring 65. For the form of rear closure operating mechanism shown in Figures 9, 10 and 11 a sheave may be located at the location where the spring 90 is connected to the closure lid 41. A cable will be trained under this sheave and attached to the adjacent end of the spring 90 and the cable extended to and attached at the point of location of the spring 46 where it is attached to the lid 43. This would eliminate spring 46 of form D.

The means for moving or tilting the receptacles A, D or E from horizontal to dumping position is selective. Vehicle B may be employed. It includes a chassis frame 115 having rear running gear 116 and front running gear 117. Hoist means C includes lift arms or booms 118, pivoted at 119 upon a frame 120 supported by the vehicle chassis 115. These boom arms are provided at each side of the vehicle and have pairs of lift chains 101a and 102b thereon adaptable for detachable connection to the lugs 51 and 52 of the bucket. The arms 118 may be elevated and lowered by hydraulic mechanism, including cylinders 125 attached pivotally (not shown) to the frame 120 and having actuated therein pistons 126 which are pivoted at 127 to the arms at a crank offset with respect to the pivot points 119. Such type of equipment is shown in U.S. Patents 2,200,020 and 2,313,514, and other vehicle attached lifting and lowering mechanism may be used such as shown in U.S. Patent 2,069,697. The hydraulic mechanism for elevating and lowering the lift arms 118 is well known in the art.

Vehicle B may employ a movable dump hook 130 manipulated from the driver's seat of the vehicle so that it will either lie collapsed or may be elevated to the position shown in Figure 1 for engaging a cross bar 105 to facilitate tipping of the receptacle in the manner above described.

As shown in Figure 11 crane attached lift chains 131 may be used (attached to lugs 52) for the lifting of the receptacle from horizontal to vertical dumping position.

As shown in Figure 8, the receptacle may have other type of hoist mechanisms provided with cables 140 with split ends 141 and 142 for detachable connection with the lugs 51 and 52 at each side of the receptacle, and any suitable means may be used for tripping the receptacle, such as a dock attached hook 104a.

Figure 12:
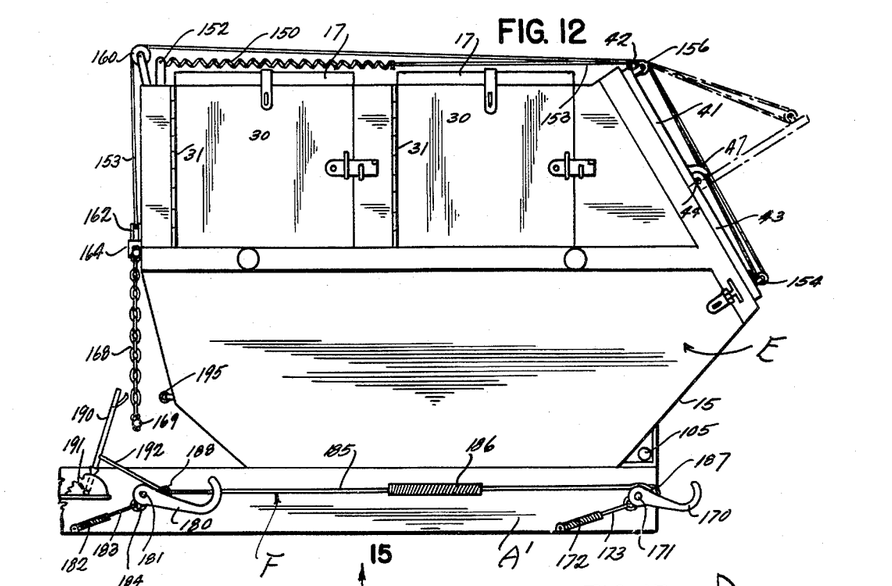
Figure 12 is a side elevation of a second modified form of means for manipulating the discharge closures of the receptacle. It shows a vehicle or support provided with equipment to facilitate manipulation of the discharge closures and tilting of the receptacle.
Figures 13, 16:
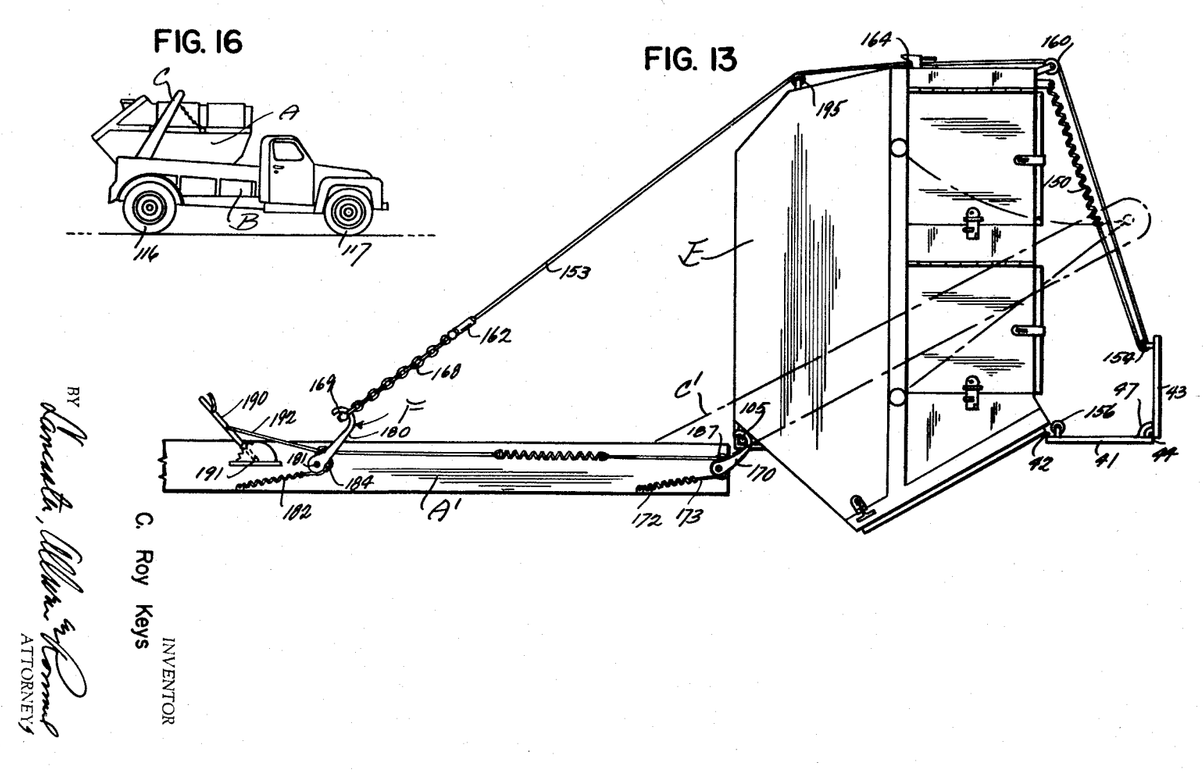
Figure 13 is a view of the details of the second modified form of invention shown in Figure 12, with the bucket in dumping position. It shows the opened positions of the discharge closures.
Figure 16 is a diagrammatic side elevation of a hauling and dumping vehicle, showing the bucket in supported horizontal position thereon and demonstrating that the center of gravity of the receptacle and load lies well ahead of the transverse axis of the rear running gear of the vehicle.
Figure 14:
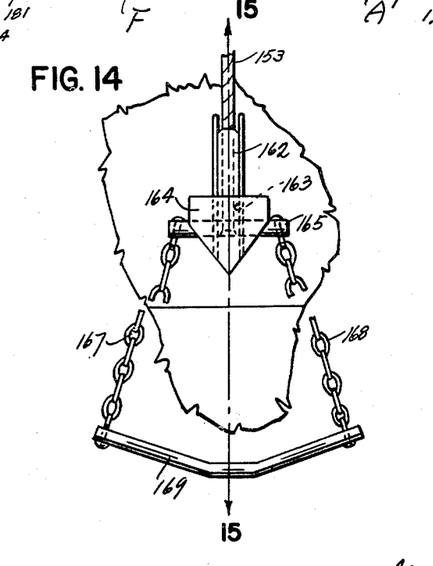
Figure 14 is a fragmentary view of a device for cooperation with a trip mechanism of the vehicle whereby to insure automatic operation of the discharge closures.
Figure 15:
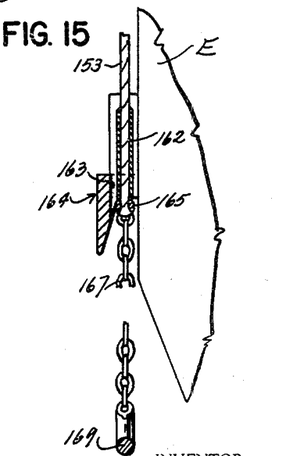
Figure 15 is a cross-sectional view taken through the device of Figure 14, substantially on the line 15—15 of Figure 14.

Referring to the second modified form of invention, as shown in Figures 12 to 15 inclusive, the receptacle E is provided with a tension spring 150 secured at its front end to a standard or lug 152 on the top wall of the body of the receptacle. It normally lies parallel with the top wall when the receptacle is in horizontal position. Its rear end has a flexible cable 153 connected thereto. This cable 153 is trained over a pulley or sheave 154 mounted upon the outer end of the closure portion 43. The cable 153 is doubled back upon itself and is releasably trained over a pulley or sheave arrangement 156 which is mounted upon the hinged end of the closure 41, as shown in Figures 12 and 13. This doubled portion of the cable 153 only engages the sheave 156 when the receptacle E is in horizontal position, or only slightly tilted with the lids closed. It moves away from the sheave 156, as is shown in Figure 13 when the receptacle E is in dumping position. The front end of the cable 153 is trained over a sheave or pulley 160 mounted on the front upper corner of the receptacle body and from thence the cable 153 extends along the front wall of the receptacle E, and at its lower end it is provided with a preferably rigid sleeve member 162 which is slidable in a socket or passageway 163 of a guide 164. The latter is welded or otherwise secured upon the front wall of the receptacle body. The sleeve 162 is of such dimension that it may readily slip into the passageways 163 but cannot slip upwardly therefrom due to a cross bar 165 which is connected at its lower end. The cross bar 165 has flexible chains 167 and 168 connected at the outer ends thereof; the lower ends of which are connected to a sort of V-shaped bar 169. The elements 165, 167, 168 and 169 in effect form a trapeze which is adapted for cooperation with a catch hook for the opening of the closures 41 and 43 of the form of receptacle E, as will be subsequently described.

The support A' may comprise a dock, platform, bed of a vehicle or any another frame, upon which the receptacle E is to be manipulated. At the rear end thereof it is provided with a trip hook 170 pivoted at 171. The hook 170 is normally maintained collapsed in the position shown in Figure 12 by means of a tensioned spring 172, and a short flexible cable end 173 which is connected to the hook so that it will normally hold the hook collapsed. A closure actuating hook 180 is pivoted at 181 upon the frame A' and normally it is held collapsed thereon by means of a tensioned spring 182 having a short cable length 183 connected at 184 to the hook 180.

The trip hook 170 and the closure actuating hook 180 are adapted for simultaneous operation, and to that end they are both connected to a cable 185. The cable 185 has a tensioned spring 186 therein. The rear end of the cable 185 is connected at 187 to the hook 170, normally tending to raise it to a tripping position, and the front end of the cable 185 is connected at 188 to closure actuating hook 180 normally holding it collapsed. A manually actuated lever 190 is pivoted at 191 upon the frame A'. This lever 190 has a cable or other connection 192 extending therefrom remote from the pivot 191 and attached at location 188 to hook 180. As lever 190 is swung from the position shown in Figure 12 to the position shown in Figure 13 both the trip hook 170 and the closure actuating hook 180 will be elevated to the effective trip and catch positions shown in Figure 13. If desired the lever 190 may have a pawl and ratchet mechanism to hold the hooks in elevated position, as is shown in Figure 13.

The normal hauling, transporting or rest position of the receptacle E is shown in Figure 12. The operator, by means of the mechanism F, will raise the hooks 170 and 180 to the position shown in Figure 13 and the catch hook 180 will then be in position to engage the trapeze bar 169. The trip hook 170 will assume the position shown in Figure 13. When the bucket E is tilted by the hoist mechanism C' to a degree that the center of gravity of the lower discharge door 43 is just past the position vertically below the hinge 44 it will swing open under the influence of gravity. As tilting progresses, the door 43 will leave contact with the body of the bucket E and assume an attitude approximately that shown in dot-and-dash lines of Figure 12; being limited by the stop 47 above described for the form of invention D. As tilting progresses to the dumping position shown in Figure 13 the upper discharge door 41 will leave contact with the body of the bucket, due to increase pull upon the cable 153, under influence of the tensioned spring 150. The lid portion 41 will then open to the position shown in Figure 13.

As the bucket body is being returned to a horizontal position the upper door will gradually close against the body of the bucket, due to the effect of gravity and paying out of the cable. The lower half of the discharge door will remain opened as indicated in the broken lines in Figure 12 and be held against the stop 47 by reason of tension of the spring 150.

The guide 164 holds the trapeze and the front lower end of cable 150 in proper position for engagement by the trip hook 180, and it is also held against twisting.

It is preferred to provide a roller 195 on the front wall of the receptacle body which the cable 150 may engage, to prevent chafing as the receptacle is tilted (see Figure 13).

From the foregoing it will be apparent that a receptacle construction for the loading, hauling and dumping of loose materials has been provided, the closures of which are so related and mounted as to enable facile opening and closing thereof. It is not necessary to have employees of unusual strength in order to manipulate this equipment. Another feature of the top and side closure arrangements is the fact that they have matched communicating openings which enable the employment of large trash or other receptacles. Still another feature is the automatically manipulated rear closure members to effect quick and complete dumping of the contents from the receptacle. Furthermore, the receptacle is so constructed so as to utilize a low height compared to the volumetric capacity of the same.

In lieu of the top and side hinged doors as shown, sliding doors may be substituted in either case.

Various changes in the shape, size and arrangement of parts may be made to the form of invention herein shown and described, without departing from the spirit of the invention or scope of the claims.

I claim:

1. In a receptacle of the class described the combination of a body casing having a chamber therein and a discharge opening thereto, a closure hingedly connected to the body casing above said opening for closing said opening, a crank pivoted to the body casing adjacent the hinged connection of the closure construction, a strut pivotally connected to the closure spaced from its hinged connection and pivotally connected at its outer end to the crank remote from the pivot connection of the crank with the body casing, a cable connected to the crank at a location remote from its pivoted connection to the casing, a spring under tension connected to the top of the body casing at one end and to the cable at its opposite end remote from the crank pivot connection, said spring normally tending to render the cable taut for the purpose of swinging the closure construction to an opened position upon tilting of the receptacle to a predetermined degree where the gravity weight of the closure construction to assume a closed position over said discharge opening will be overcome.

2. In loading and dumping equipment the combination of a receptacle including a body casing having a discharge opening at the rear end thereof, closure means for said discharge opening, a supporting frame, a movable tripping hook pivotally mounted upon the frame and positioned to engage the rear of the receptacle when the receptacle is tilted to enable tilting of the receptacle for dumping materials through said discharge opening, a movable closure actuating hook mounted upon the supporting frame, means of releasably connecting the closure actuating hook with the closure means for the discharge opening whereby to open the closure means when the body casing is tilted, and a single means for simultaneously actuating both of said hooks to operative receptacle tilting and closure actuating positions.

3. Loading and dumping equipment as described in claim 2 in which means is provided to normally hold said tilting hook and closure actuating hook in collapsed inoperative positions upon said supporting frame.

4. In a loading, hauling and dumping construction the combination a bucket casing including a bottom wall, side walls, a front wall, a top wall, and having a rear discharge opening, a closure for the rear discharge opening hingedly connected at its upper end to the casing above said discharge opening, a closure actuating cable construction having means for connection to a support at the lower front of the casing, said cable being extended upwardly when the casing is in rest position and trained rearwardly over the top of the casing and having the rear end thereof trained over the rear end of the casing to a downward location over the closure construction, said cable being then doubled upon itself at said closure construction and slidably connected at the bight of said double to the closure construction remote from its pivot axis, and a tensioned spring over the casing connected at one end to the end of said doubled portion of the cable construction and at its other end to the casing at the front of the casing and at the top of the casing.

5. In a loading and dumping receptacle the combination of a body casing having side walls, a front wall, a bottom wall, a top wall, and having a rear discharge opening, a closure connected upon the body casing for said discharge opening hinged at a location above said discharge opening, a flexible cable connected to said closure below its hinge connection, said cable extending forwardly along a medial fore and aft line at the top of the body casing, reefing means at the front of the body casing over which the cable construction is trained and then doubled upon itself and extending rearwardly over the top of the body casing along said medial line, a tension spring connected with the cable at the forward extended end above mentioned, said spring normally being under tension and at its rear being connected to the body casing, the tension of the spring being such that as the casing is tilted rearwardly and assisted by the weight of the closure and the material being dumped the closure will be caused to open, said top wall along each side of the medial line thereof being provided with charging openings and closure means for the said top charging openings.

6. A loading, hauling and dumping receptacle comprising a body casing having side walls, a top wall, a front wall, a bottom wall, and having a rear loading and discharge opening, a stationary strut rigidly connected to the body casing at the rear thereof extending above the top wall, a multiple closure construction for the discharge opening including an upper door section pivotally connecting the body casing above the discharge opening and a lower closure section pivotally connected to the free swinging end of the upper closure section, a tension spring connected to the upper end of said strut above the body casing and connected at its lower end to the upper closure section at a point thereon appreciably spaced below the pivot of the upper closure section upon said casing, said spring being under tension sufficient to open the closure construction as the receptacle is tilted rearwardly and downwardly into dumping position, and tension spring means connecting the two closure constructions together spaced from and at opposite sides of the hinge connection of the two closure sections and normally being under tension across said hinge connection to initially open the lower closure section as the receptacle is tilted into dumping position as aforesaid.

7. A loading and dumping receptacle comprising a body casing having a chamber therein provided with a discharge opening, a multiple lid closure means comprising an upper door section and a lower door section hingedly connected to the free end of the upper door section, means hingedly connecting the upper door section to the body casing above the top of the discharge opening, a lever pivotally connected upon the exterior of the upper door section below the hinge connection and movable transverse to the plane thereof, a spring device under tension connected upon the top of the body casing and rearwardly having means connecting it to the outer end of the lever to automatically throw the door section to open position upon sufficient degree of downward and rear tilting of the receptacle, and spring means connecting the upper door section and the lower door section spaced from and at opposite sides of the hinge connection of said door sections and tensioned to hold the lower door section closed over the discharge opening when the receptacle is in normal rest position with the door sections closed.

8. In a loading and dumping receptacle, the combination of a body casing having side walls, a front wall, a bottom wall, a top wall, and having a rear discharge opening, a closure connected upon the body casing for said discharge opening hinged at a location above said discharge opening, a flexible cable connected to said closure below its hinge connection, said cable extending forwardly along a medial fore and aft line at the top of the body casing, reefing means at the front of the body casing over which the cable construction is trained and then doubled upon itself and having a returned portion extending in a rearward direction over the top of the body casing along said medial line of the body casing, and a tension spring connected at its front end with the returned portion of the cable and the spring at its opposite end being connected to the casing, said spring normally being under tension such that as the casing is tilted rearwardly and assisted by the weight of the closure and the material being dumped the closure will be caused to open.

9. In a loading and dumping receptacle, the combination of a bottom wall, a front wall, a lower rear end wall, a top wall, and side walls, all of said walls being rigidly connected together, and the receptacle above the lower rear end wall having a rear opening, a closure construction for said rear opening hinged upon the receptacle at the top of said rear opening, a flexible cable trained over the top of the receptacle and having a rear end connection with the closure construction at a location below the hinged connection, and a spring under tension connected with said receptacle at one end and at its other end being connected to the forward portion of said cable and normally acting to maintain the cable under tension whereby as the receptacle is tilted upon its lower rear portion the action of said spring and the weight of the closure construction as the receptacle is tilted to a sufficient degree will cause an opening of the closure for dumping of the materials from within the closure.

References Cited in the file of this patent

UNITED STATES PATENTS

| | | |
|---|---|---|
| 691,330 | Watson | Jan. 14, 1902 |
| 1,106,523 | Streich | Aug. 14, 1914 |
| 1,612,223 | Robinson | Dec. 28, 1926 |
| 1,743,094 | Barrett | Jan. 14, 1930 |
| 1,960,096 | Winner | May 22, 1934 |
| 2,014,591 | Sanders | Sept. 17, 1935 |
| 2,316,826 | Wachter | Apr. 20, 1943 |
| 2,619,092 | Ayers | Nov. 25, 1952 |
| 2,702,142 | Jones | Feb. 15, 1955 |
| 2,702,721 | Dempster | Feb. 22, 1955 |
| 2,752,194 | Galloway | June 26, 1956 |
| 2,772,919 | Jones | Dec. 4, 1956 |